(12) United States Patent
Trionfetti

(10) Patent No.: US 8,991,064 B2
(45) Date of Patent: Mar. 31, 2015

(54) MEASUREMENT HEAD FOR FEELER FOR WORKPIECES BEING MACHINED

(71) Applicant: Gianni Trionfetti, Agrate Brianza (IT)

(72) Inventor: Gianni Trionfetti, Agrate Brianza (IT)

(73) Assignee: Balance Systems S.R.L., Milan (IT)

( * ) Notice: Subject to any disclaimer, the term of this patent is extended or adjusted under 35 U.S.C. 154(b) by 197 days.

(21) Appl. No.: 13/849,175

(22) Filed: Mar. 22, 2013

(65) Prior Publication Data

US 2013/0255092 A1     Oct. 3, 2013

(30) Foreign Application Priority Data

Mar. 30, 2012  (EP) .................................... 12162352

(51) Int. Cl.
- G01B 5/08     (2006.01)
- B24B 49/04    (2006.01)
- G01B 7/00     (2006.01)
- G01B 7/12     (2006.01)

(52) U.S. Cl.
CPC ................ *G01B 5/08* (2013.01); *B24B 49/045* (2013.01); *G01B 7/001* (2013.01); *G01B 7/12* (2013.01)
USPC .......................................... 33/555.1; 33/552

(58) Field of Classification Search
CPC ........ B24B 49/04; B24B 49/045; G01B 5/08; G01B 7/001; G01B 7/12; G01B 7/13
USPC ............. 33/501.1, 501.5, 550, 551, 552, 553, 33/555, 555.1

See application file for complete search history.

(56) References Cited

U.S. PATENT DOCUMENTS

| | | | |
|---|---|---|---|
| 3,962,792 A * | 6/1976 | Stepanek et al. | ............. 33/555.1 |
| 4,279,079 A | 7/1981 | Gamberini et al. | |
| 4,409,737 A | 10/1983 | Golinelli | |
| 4,625,413 A | 12/1986 | Possati et al. | |
| 5,337,485 A * | 8/1994 | Chien | ............................. 33/550 |
| 5,351,410 A | 10/1994 | Hainneville | |
| 6,067,721 A * | 5/2000 | Dall'Aglio et al. | .......... 33/555.1 |
| 6,098,452 A * | 8/2000 | Enomoto | ........................ 33/503 |
| 6,389,867 B2 | 5/2002 | Golinelli | |
| 6,546,642 B1 | 4/2003 | Dall'Aglio et al. | |
| 2006/0026853 A1 * | 2/2006 | Trionfetti | ........................ 33/552 |
| 2006/0042109 A1 * | 3/2006 | Kanai et al. | .................. 33/555.1 |

OTHER PUBLICATIONS

The European Search Report issued for EP Application No. EP 12 16 2352, three pages, completed Jul. 20, 2012.

* cited by examiner

*Primary Examiner* — G. Bradley Bennett

(74) *Attorney, Agent, or Firm* — Vorys, Sater, Seymour and Pease LLP; Susanne M. Hopkins

(57) ABSTRACT

Provided is a measuring head (1) for a feeler (2) of workpieces (3) being machined, including a fixed portion (10) to be secured to an outer fixed support, a movable portion (11) including a constraint element (14) for a feeler arm (4), a rotational hinge (12) adapted to connect the fixed portion (10) to the movable portion (11), wherein the fixed portion (10), movable portion (11) and pivot bearing (12) are of one piece construction.

8 Claims, 2 Drawing Sheets

MEASUREMENT HEAD FOR FEELER FOR WORKPIECES BEING MACHINED

FIELD OF THE INVENTION

The present invention relates to a measuring head for a feeler of workpieces being machined, the measuring head comprising: a fixed portion to be secured to an outer fixed support, a movable portion comprising a constraint element for a feeler arm, a rotational hinge adapted to connect the fixed portion to the movable portion.

DESCRIPTION OF THE PRIOR ART

It is known that presently, for checking the sizes and tolerances of a workpiece, in particular during grinding, an appropriate measuring device is used. This device comprises at least one feeler, contacting the surface of the workpiece and connected to a measuring apparatus. The latter, based on displacements of the feeler, detects the sizes and signals them to the machine tool, possibly operating intervention or stoppage thereof.

For instance, for measuring a diameter of a cylindrical grinding shaft, the measuring device is provided with two feelers brought into contact with the workpiece at diametrically opposite sides. Otherwise, for measuring the axial position of a shoulder or the like for example, only one feeler is provided.

Each feeler comprises an arm having, at one end, a contact element adapted to feel the piece to be measured, and a measuring head.

The measuring head is suitable to enable rotation of the feeler arm, fix the arm to the measuring device and convert the arm displacements into suitable electric signals that can be analysed by the machine tool.

Said head comprises a fixed portion to be fastened to the measuring device, a movable portion connected through a suitable hinge to the fixed portion and adapted to bear the feeler arm, sensors adapted to measure the displacement of the movable portion relative to the fixed portion and possible actuators for moving the movable portion relative to the fixed portion during loading and unloading of the workpieces, for example.

The known art mentioned above has some important drawbacks.

In fact, said measuring heads are expensive and susceptible of malfunction. In fact, even the mere assembling of the individual elements of the head has to be made in a very accurate manner, since the feelers must have very reduced tolerances.

At the same manner, even a small mutual phase displacement of the head components can cause completely wrong measurements. Continuous maintenance contemplating constant adjustments is therefore required.

SUMMARY OF THE INVENTION

Under this situation, the technical task underlying the present invention is to conceive a measuring head for a feeler of workpieces being machined capable of substantially obviating the mentioned drawbacks.

Within the scope of this technical task it is an important aim of the invention to obtain a measuring head for a feeler of workpieces being machined that is cheap and susceptible of few malfunctions.

The technical task mentioned and the aims specified are achieved by a measuring head for a feeler of workpieces being machined, the measuring head comprising: a fixed portion to be secured to an outer fixed support, a movable portion comprising a constraint element for a feeler arm, a rotational hinge adapted to connect said fixed portion to said movable portion, said rotational hinge being a flexural pivot bearing made up of metal elements adapted to be elastically deformed, comprising a cylindrical cavity and a plurality of blades passing through the cylindrical cavity and defining a plurality of cylindrical sectors, and being of one piece construction with at least one of the fixed portion and the movable portion.

BRIEF DESCRIPTION OF THE DRAWINGS

The features and advantages of the invention are hereinafter clarified by the detailed description of a preferred embodiment of the invention, with reference to the accompanying drawings, in which.

Figure 1:
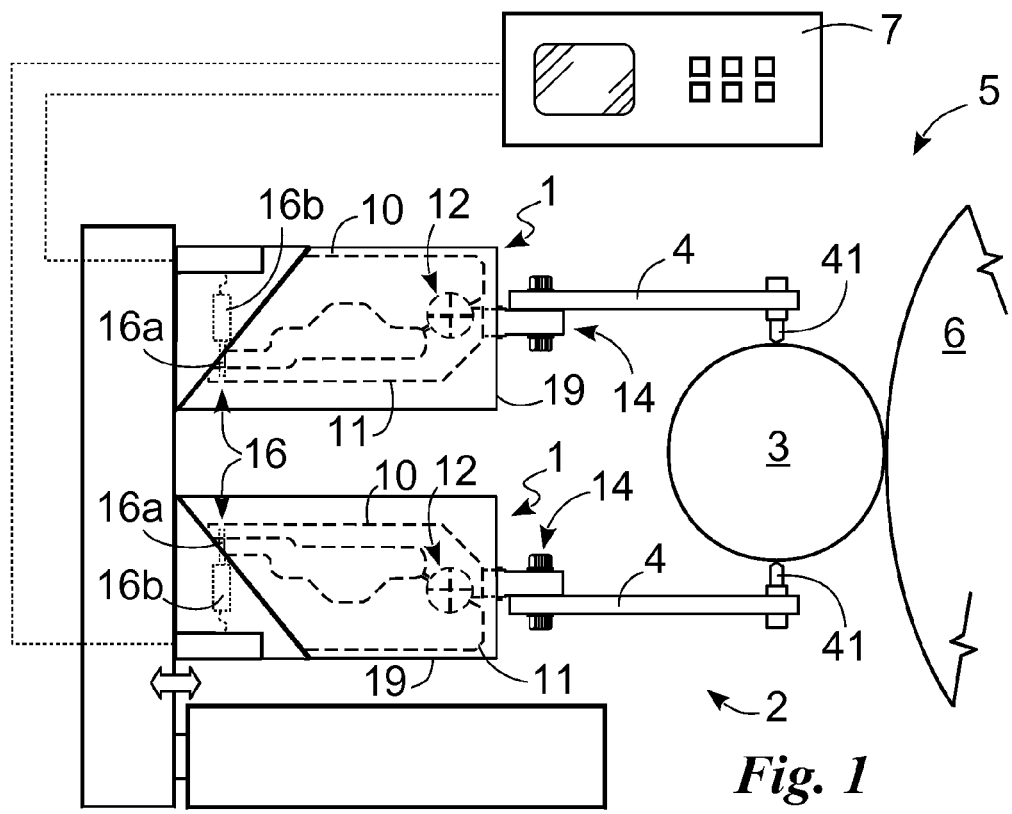
FIG. 1 shows a measuring device including a measuring head according to the invention.
Figure 2:
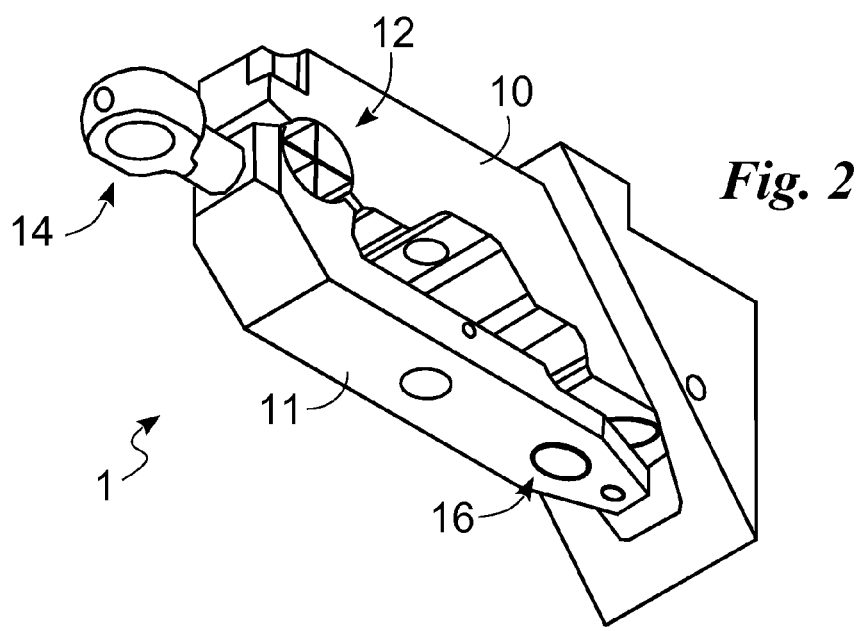
FIG. 2 is an axonometric view of the measuring head according to the invention.

With reference to the mentioned figures, the measuring head according to the invention is generally identified by reference numeral 1.

It is suitable for use in a feeler 2 for workpieces 3 being machined.

Feeler 2 briefly comprises a measuring head 1 and a feeler arm 4, including a contact element 41, consisting of a pin or ball of ceramic material or the like, adapted to feel the workpiece 3 being machined.

Feelers 2 are in turn part of a measuring device 5 adapted to be used for measuring the accuracy of a chip-removal machining operation while said operation is taking place. The measuring head 1 is therefore adapted to be disposed close to a chip-removal machine tool, in particular a grinding machine comprising a tool 6, such as a grinding wheel for example. Preferably, the measuring head 1 is placed close to a grinding machine for measuring the diameter of the workpiece 3 or for carrying out other measurements such as the axial measurement of a shoulder.

In particular, as far as measurement of the diameter of a workpiece 3 being machined on a grinding machine is concerned, it is used a measuring device 5 that comprises two feelers 2 and a measuring apparatus 7 electrically connected to the feelers 2, and in particular to the measuring heads 1.

The bearing device 1 briefly comprises a fixed portion 10, a movable portion 11, to be secured to the feeler arm 4, and a rotational hinge 12 adapted to secure the movable portion 11 to the fixed portion 10.

In addition, advantageously, the rotational hinge 12 is of one piece construction with at least one of the fixed portion 10 and movable portion 11 and preferably with both of them. In greater detail the fixed portion 10, movable portion 11 and hinge 12 are of one piece construction and made of metal, preferably steel, from a solid piece, as better specified in the following.

The fixed portion 10 can be secured to an outer fixed support such as a fixed part of the measuring device 5, through suitable screws and suitable threaded seats formed in the fixed portion 3.

It approximately has the shape of an elongated parallelepiped one end of which can be connected to the measuring device 5, the opposite end being rigidly secured to the hinge 12.

The movable portion 11 too is rigidly connected to the rotational hinge 12 and comprises a constraint element 14 for the feeler arm 4, preferably consisting of a loop or other seat for constraint means of various type.

The movable portion 11 too has the shape of an elongated parallelepiped disposed next and parallel to the fixed portion 10, preferably along almost the whole of the fixed portion 10 itself. The constraint element 14 is disposed in the vicinity of hinge 12.

Therefore an approximately parallelepiped-shaped cavity 13 is present between the fixed portion 10 and movable portion 11.

The fixed 10 and movable 11 portions further comprise a seat 15 for a movement sensor 16. The seat 15 comprises a hole in the movable portion 11 for introduction of a first part 16a of sensor 16, made integral with the movable element 11 itself. The seat 15 further comprises a recess disposed in the fixed portion 10 and adapted to house a second part 16b of sensor 8. Sensor 15 is adapted to detect the displacement of the movable portion 11 around hinge 12. In particular, it is adapted to generate a signal, of the electric type, directly proportional to the displacement, and consequently the position, of the contact element 41 relative to the fixed element 10. It for example consists of an inductive displacement transducer and, more specifically, a known sensor of the LVDT type i.e. a Linear Variable Differential Transformer, known by itself.

Hinge 12 suitably is a hinge of the type commonly referred to as flexural pivot bearing or flexural pivot. It consists of thin plate metal elements or at all events elements of reduced thickness, adapted to be elastically deformed, in particular if deformed by few degrees. Hinge 12 in particular comprises a plurality of, and preferably two, suitably perpendicular blades 12a diametrically passing through a cylindrical cavity 12b in which blades 12a define a plurality of, and preferably four, cylindrical sectors 12c. The side surface of the cylindrical cavity 12b partly (preferably about 50%) borders on the fixed element 2 and partly borders on the movable element 3.

Also defined at hinge 5 are two recesses 12d, adapted to separate the portions adjacent to the cylindrical cavity 12a of the fixed 10 and movable 11 portions and to enable maximum mutual angular displacement of said portions included between 2° and 10°, and preferably between 4° and 6°.

Head 1 finally comprises a protection case 19 adapted to protect head 1 and also to enable inner lubrication thereof. Case 19 is secured by means of screws fastened in seats 19a disposed in the fixed portion 10, and preferably close to the constraint element 14 comprises a seal suitable to ensure hermetic closure of case 19.

The invention further comprises a new process for making a measuring head 1 as previously described, including a chip-removal machining step and an electrical-discharge machining step in which at least the rotational hinge 12 is formed.

Figure 3A:
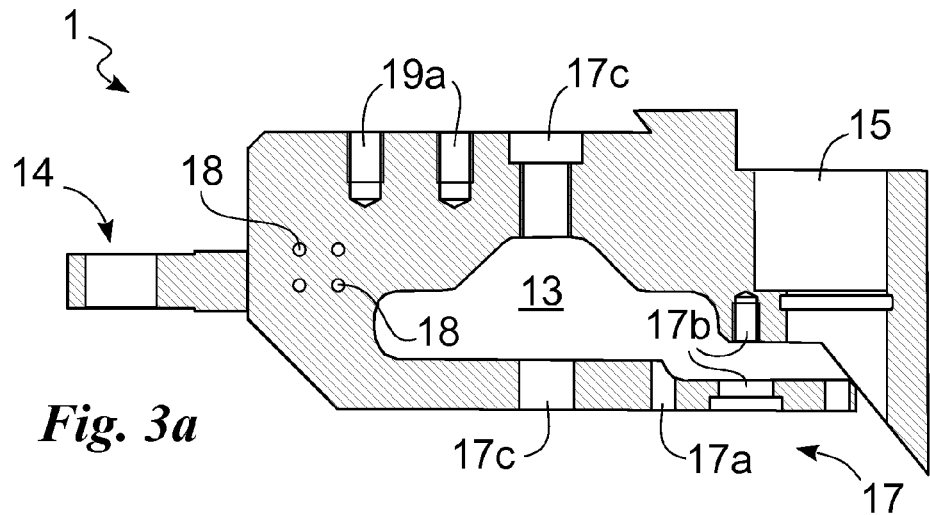
FIG. 3a shows a first section of the measuring head according to the invention.
Figure 3B:
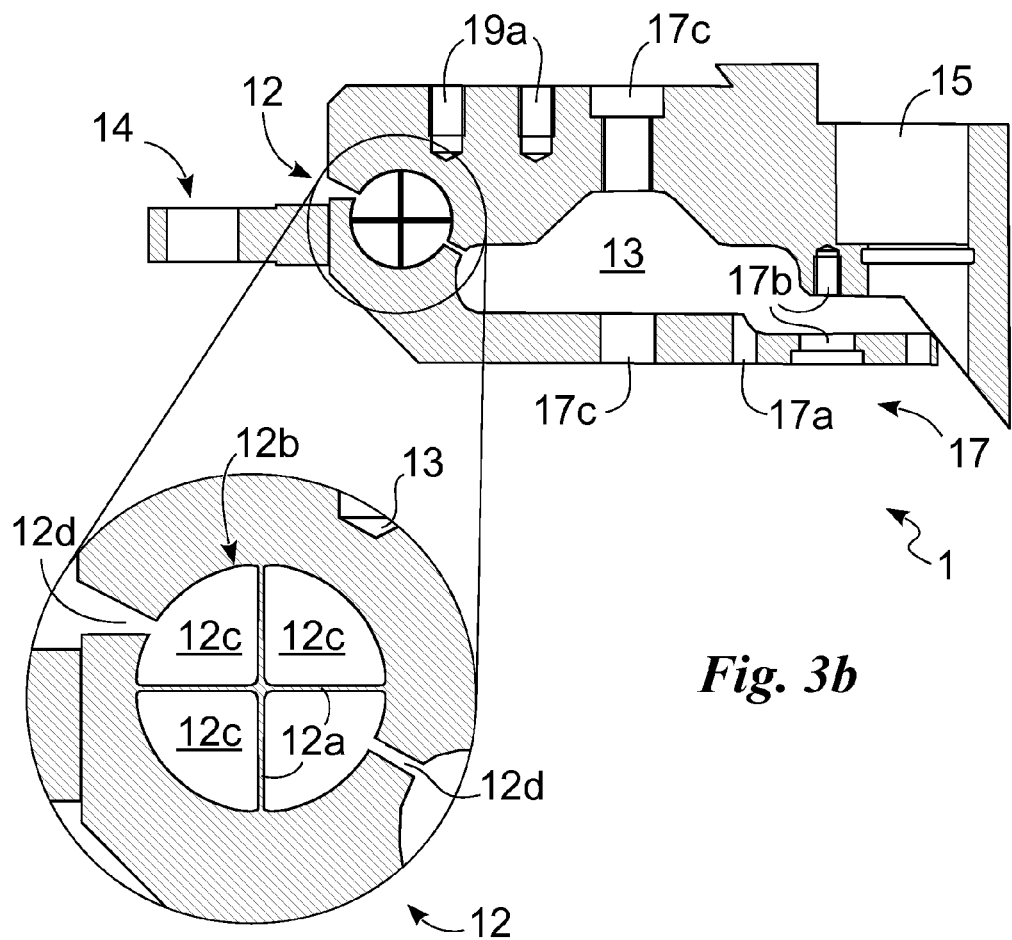
FIG. 3b shows a second section of the measuring head according to the invention.

In particular, the measuring head 1 is substantially formed in its entirety in the chip-removal machining step, except for the hinge 12. Chip removal is obtained through tools known by themselves and adapted to mechanically act on the piece. From the chip-removal machining step it is preferably obtained a device comprising through holes 18 at the cavities defined by the hinge 12, as shown in FIG. 3a.

In particular, provision is made for a through hole 18 for each cylindrical sector 12c or at least for the cylindrical sectors 12c that do not border on the recesses 12d. The chip-removal machining step is followed by the electrical-discharge machining step. It is obtained by wire electrical discharge machining (WEDM), which operation is known by itself.

Therefore, formed through said electrical discharge machining are the cylindrical sectors 12c defining the cylindrical cavity 12b and, where the material is not removed, blades 12. In addition, also recesses 12d are suitably formed through the same technique. In particular each individual cylindrical sector 12c is formed by introducing the wire for the electrical discharge inside a through hole 18 or through the recesses 12d.

In addition, also cavity 13 can be formed through electrical discharge machining. Operation of the measuring head 1 described above as regards its structure is the following.

The operator using the measuring device 5 for employing and carrying out said size and tolerance controls acts as follows. First of all he/she carries out calibration of the feeler on the sizes of a certified sample. Subsequently the certified sample is moved away from the feeler and the feeler 2 is disposed on the workpiece 3, then machining, in particular grinding, begins.

The feeler then measures the size with the greatest accuracy and signals to the machine tool when the correct size, i.e. the size defined during the planning step, has been reached.

In particular, the contact element 41 is placed in contact with the workpiece 3. When the workpiece 3 changes its diameter or shape, the contact element 41 is moved by rotation around hinge 12. Consequently also moved are arm 4, constraint element 14, movable portion 11 and first movable part 16a of sensor 16. The second part 16b of sensor 16 is on the contrary rigidly secured to the fixed portion 10 that remains fixed.

Sensor 16 then measures the displacement of the two parts 16a and 16b and transmits an electric signal proportional to the measuring device 5 which displays to the user, the displacement of the contact element 41 and the consequent measured size.

The invention achieves important advantages.

In fact, the measuring head 1 being substantially made of one piece construction is not submitted to unbalance, disassembling and consequent measuring errors and therefore requires a reduced maintenance.

In addition, the described process enables a head 1 to be made that is cheap and has a high accuracy degree.

The invention is susceptible of variations falling within the inventive idea. All of the details can be replaced by equivalent elements and the materials, shapes and sizes can be of any nature and magnitude.

The invention claimed is:

1. A measuring head for a feeler of workpieces being machined, said measuring head comprising: a fixed portion to be secured to an outer fixed support; a movable portion comprising a constraint element for a feeler arm; and a rotational hinge adapted to connect said fixed portion to said movable portion, said rotational hinge being a flexural pivot bearing made up of metal elements adapted to be elastically deformed, said rotational hinge comprising a cylindrical cavity and a plurality of blades passing through said cylindrical cavity and defining a plurality of cylindrical sectors, and said rotational hinge being of one piece construction with at least one of said fixed portion and movable portion.

2. The measuring head as claimed in claim 1, wherein said rotational hinge, fixed portion and movable portion are of one piece construction.

3. The measuring head as claimed in claim 2, wherein said blades are two in number, substantially mutually perpendicular and passing through said cylindrical cavity substantially diametrically.

4. The measuring head as claimed in claim 1, wherein at said hinge two recesses are present which are adapted to separate the portions adjacent to a cylindrical cavity of said fixed and movable portions and adapted to enable mutual angular displacement of said portions.

5. A process for making a measuring head as claimed in claim 1, comprising a chip-removal machining step and an electrical discharge machining step in which at least said rotational hinge is formed.

6. The process as claimed in claim 5, wherein said electrical discharge machining step is carried out by wire electrical discharge machining.

7. The process as claimed in claim 5, wherein said rotational hinge is a flexural pivot bearing consisting of metal elements adapted to be elastically deformed and comprising a cylindrical cavity and a plurality of blades passing through said cylindrical cavity and defining a plurality of cylindrical sectors, and wherein in said chip-removal machining step through holes are formed at least at one of said cylindrical sectors and in said electrical discharge machining step said through holes are machined for obtaining said cylindrical sectors.

8. The process as claimed in claim 5, wherein said measuring head comprises a cavity between said fixed portion and movable portion, said cavity being made by said electrical discharge machining step.

\* \* \* \* \*